United States Patent [19]

Hardwicke, III

[11] 3,996,688
[45] Dec. 14, 1976

[54] FISHING LURE

[76] Inventor: James E. Hardwicke, III, 210 Horseshoe Circle, Columbia, S.C. 29204

[22] Filed: Oct. 7, 1975

[21] Appl. No.: 620,407

[52] U.S. Cl. .............................. 43/42.09; 43/42.11; 43/42.28

[51] Int. Cl.² ...................................... A01K 85/00

[58] Field of Search ........... 43/42.09, 42.11, 42.13, 43/42.28

[56] References Cited

UNITED STATES PATENTS

| 655,603 | 8/1900 | Cantrell | 43/42.09 |
| 1,776,090 | 9/1930 | Shroyer | 43/42.09 |
| 2,111,020 | 3/1938 | Arbogast | 43/42.28 |
| 3,143,824 | 8/1964 | Thomas | 43/42.11 |
| 3,500,573 | 3/1970 | Hudson | 43/42.11 |

Primary Examiner—Louis G. Mancene
Assistant Examiner—Daniel J. Leach
Attorney, Agent, or Firm—Roylance, Abrams, Berdo & Kaul

[57] ABSTRACT

Fishing lure of the type having a weighted body and a skirt comprising an attaching sleeve and flexible strands extending from the sleeve, characterized by having the sleeve of the skirt engaged over a forwardly projecting part of the body so that the skirt can be removed and replaced with ease, even when the lure includes, e.g., spinner support structure extending rearwardly from the body and over which the sleeve of the skirt cannot be passed.

16 Claims, 12 Drawing Figures

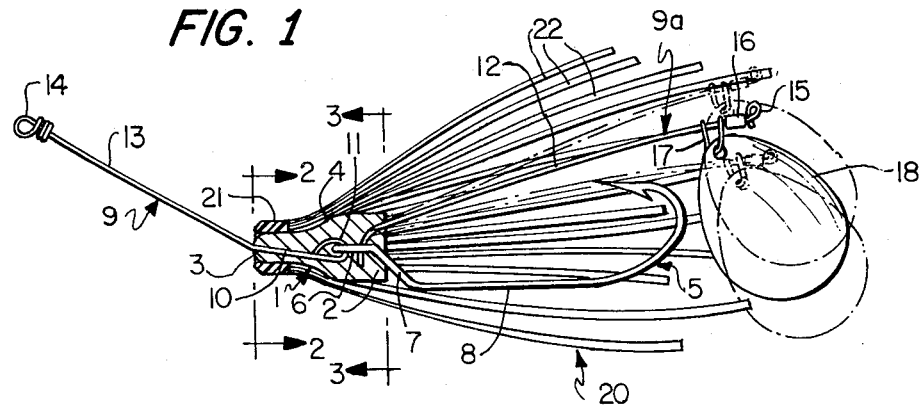
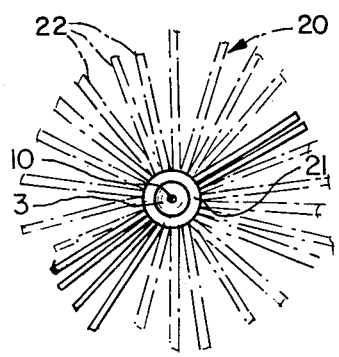
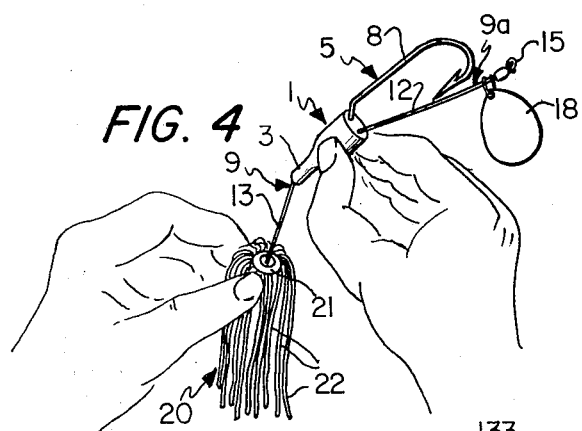
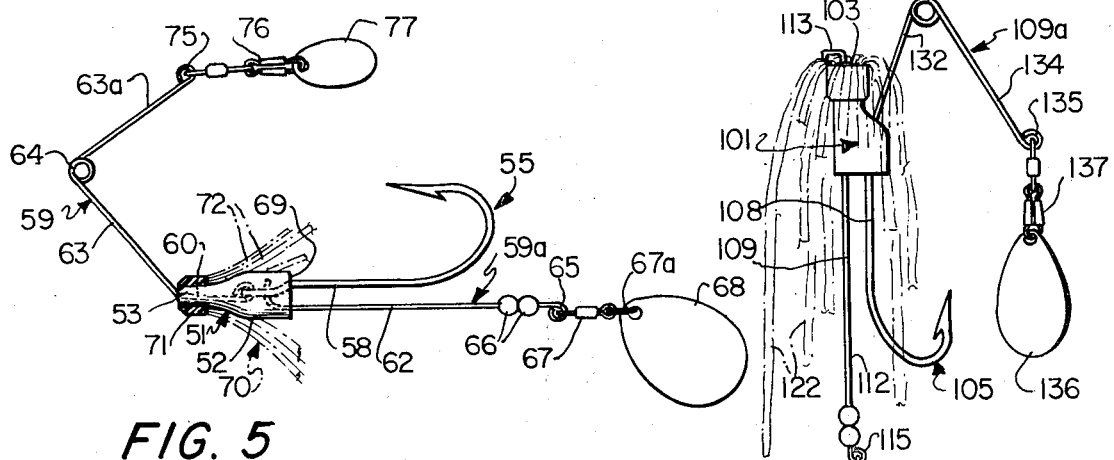

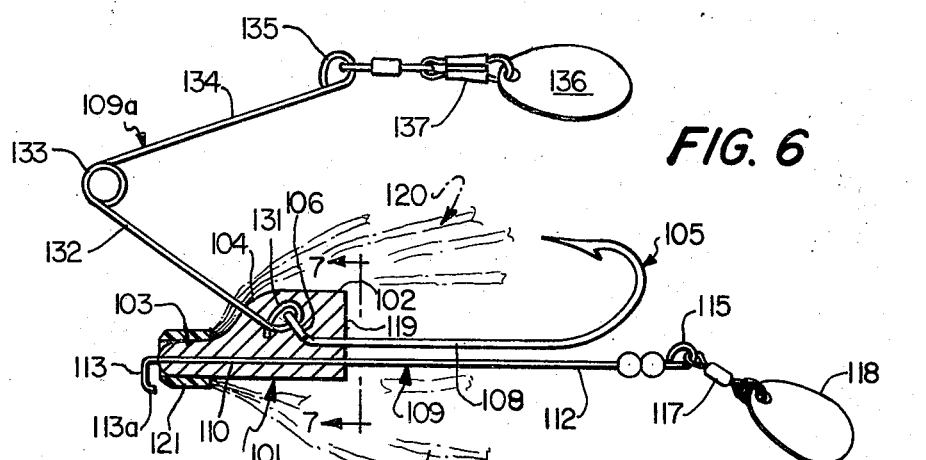
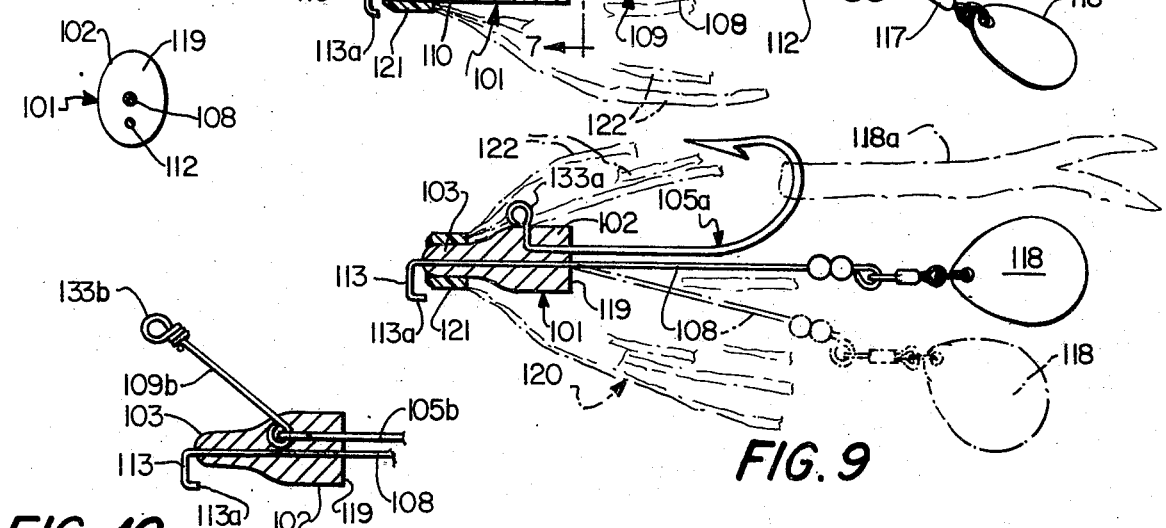
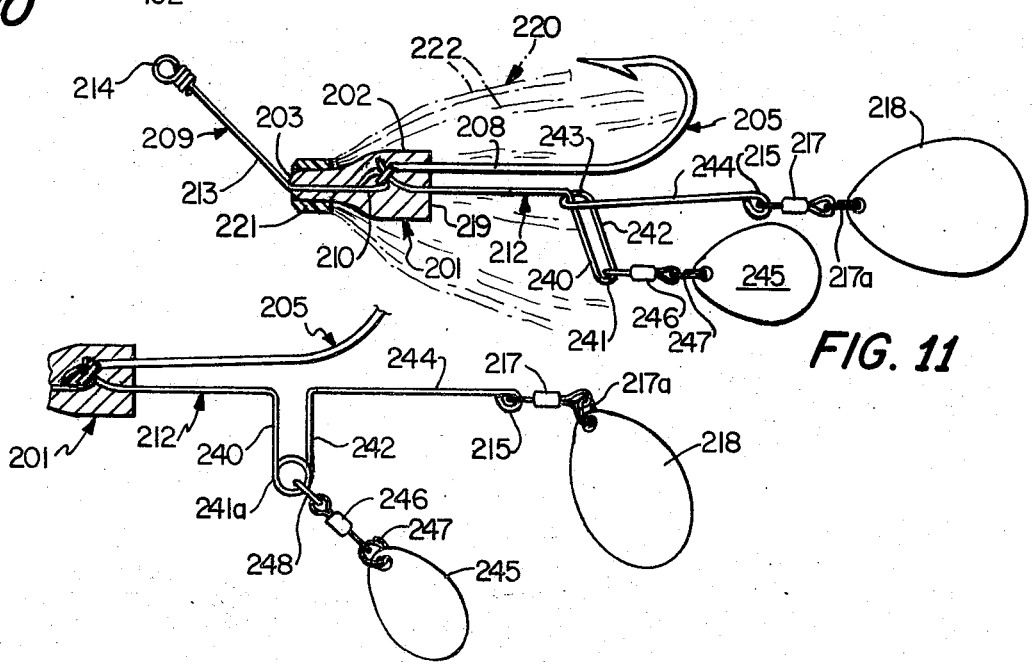
FIG. 6
FIG. 7
FIG. 9
FIG. 10
FIG. 11
FIG. 12

FISHING LURE

BACKGROUND OF THE INVENTION

Fishing lure comprising a small weighted body through which the forward end portion of a hook passes, usually being embedded in the body, with a trailing spinner, an out-riggered spinner, or both, have been known for many years and have become increasingly popular as bass lures. The broad concept of such a lure was disclosed at least as early as 1919 in U.S. Pat. No. 1,295,617 to Shannon. Much of the more recent popularity of such lures has resulted from the addition of a stranded skirt, attached to the weighted body in such a fashion that the flexible strands of the skirt trail and flutter as the lure is drawn through the water. As seen in U.S. Pat. No. 3,500,573 to Hudson, for example, such skirts comprise a small sleeve which can be slipped over the hook and onto the trailing end of the weighted body, the strands being integral with and extending from the end of the sleeve which trails in the completed device. Though such lures have achieved wide acceptance, they have the disadvantage that only a minimum of structure, typically only the shank of the hook, can extend rearwardly from the lure body, otherwise the sleeve of the skirt cannot be slipped into place. Additionally, once the sleeve of the skirt has lost any significant amount of its elasticity, the skirts can become dislodged, as a result of casting and working of the lure, the skirt then slipping rearwardly onto the shank of the hook when cast, so that the skirt is either lost or spoils the action of the lure on that retrieve. If the skirts are interchangeable, the problem is accentuated, because the fisherman may not be adept enough to force the slightly resilient sleeve of the skirt fully onto the lure and because the sleeve of the skirt may become slightly enlarged after a number of skirt changes have been made.

OBJECTS OF THE INVENTION

A general object of the invention is to devise an improved lure of the type described in which the skirt is applied at the leading end of the lure body in a manner which overcomes the disadvantages characteristic of prior-art lures.

Another object is to provide such a lure in which the skirt can be replaced for repair or color change, without requiring unusual skill for the replacement and without increasing the danger of loss or displacement of the skirt.

A further object is to provide such a lure in which the user can reverse the skirt when desired.

Yet another object is to device such a lure which can include a trailing spinner supported by a wire or the like which extends through the weighted body and rearwardly thereof.

A still further object is to provide a weighted body, flexible skirt type of lure having an improved trailing spinner arrangement.

SUMMARY OF THE INVENTION

Broadly considered, lures according to the invention comprise a weighted body, typically of cast lead, having a forwardly projecting nose portion, a wire element extending forwardly through the nose portion and projecting therefrom, hook means connected to the body and trailing the same, and a skirt comprising an attaching sleeve and a plurality of strands extending from one end of the attaching sleeve, the skirt being installed by running the sleeve over the wire element and forcing it onto the nose portion of the body. Advantageously, the wire element constitutes the short leader means to which the line is attached, and the wire element also constitutes part of wire means which extends through the body and projects rearwardly therefrom to mount a trailing spinner.

In order that the manner in which the foregoing and other objects are achieved according to the invention can be understood in detail, particularly advantageous embodiments thereof will be described with reference to the accompanying drawings, which form part of the original disclosure hereof, and wherein:

FIG. 1 is a view, partly in side elevation and partly in longitudinal cross-section, of a lure according to one embodiment of the invention;

FIGS. 2 and 3 are transverse cross-sectional views taken generally on lines 2—2 and 3—3, respectively;

FIG. 4 is a perspective view illustrating the manner in which the skirt of the lure of FIG. 1 is installed;

FIG. 5 is a view similar to FIG. 1 illustrating a lure according to another embodiment;

FIG. 6 is a view similar to FIG. 1 showing a lure according to a further embodiment;

FIG. 7 is a transverse sectional view taken generally on line 7—7, FIG. 6;

FIG. 8 is a view of the lure of FIG. 6 with the skirt reversed;

FIG. 9 is a view similar to FIG. 1 of a lure similar to that of FIG. 6 but having a different form of hook and a modified line attachment;

FIG. 10 is a fragmentary longitudinal sectional view illustrating a further modification of the lure of FIG. 6;

FIG. 11 is a view similar to FIG. 1 of a lure according to yet another embodiment; and FIG. 12 is a fragmentary view similar to FIG. 11, showing a modified form of the trailing spinner arrangement of the lure shown in FIG. 11.

THE EMBODIMENT OF FIGS. 1–4

The lure illustrated in FIGS. 1–4 comprises a weighted body 1 including a larger main portion 2 and a forwardly projecting nose portion 3 which is of circular transverse cross-section substantially smaller than the maximum transverse dimension of main portion 2 so that the two portions are joined by a tapered portion 4. Hook 5 is of the offset shank type having an eye 6, an offset portion 7 and a straight shank portion 8, the arrangement being such that shank portion 8 extends rearwardly from the bottom of the lure so that the lure normally rides hook-point-up. In addition to the hook, body 1 carries a first wire element 9 and a second wire element 9a, both being shapable by bending. Element 9 includes a straight portion 10 and an offset portion 11, the latter extending upwardly through the hook eye 6 and both portions being embedded in body 1. Element 9 further includes a forwardly extending leader portion 13 which slants upwardly and away from body 1 and terminates in a line attachment eye 14. The forward end portion of element 9a is embedded in body 1 and extends downwardly through hook eye 6.

Body 1 is advantageously cast of lead, with the appropriate portions of hook 5 and wire elements 9 and 9a embedded therein as shown. At the tip of nose portion 3, wire member 9 is bent so that portion 13 slants forwardly and upwardly therefrom. Wire element 9a includes a main portion 12 which extends rearwardly from a point near the top of the trailing end of body 1 and terminates in a stop loop 15. Forwardly of loop 15, wire portion 12 carries a bearing bead 16 and the conventional bail 17 which extends through the opening of a spinner blade 18. Wire portion 12 is bendable so that the user can adjust its position relative to hook 5 in order to vary both the weedless characteristics and the hooking characteristics of the lure, as will be apparent from the broken lines in FIG. 1.

From FIG. 3, it will be seen that main portion 2 of body 1 is of generally oblong transverse cross-section, the vertical dimension being greater than the horizontal dimension when the lure is in the normal position shown in FIG. 1. Body 1 has a flat trailing end face 19, FIG. 3, and the distance between wire 9 and hook 5 where they emerge from end face 19 is substantial in comparison with the transverse area offered by the rounded tip of nose portion 3.

Skirt 20 is conventional and produced from a suitable thermoplastic polymeric material, typically polyethylene, having some resiliance, high flexibility and high water resistance. The skirt comprises a relatively thick attaching sleeve 21 and, extending from one end of the sleeve, a large plurality of flat elongated ribbon-like strands 22 which are thin in comparison with the radial thickness of sleeve 21. Of limited extensibility, sleeve 21 has a normal diameter such that it can be forced axially onto nose portion 3 until the sleeve tightly embraces the nose portion.

As shown in FIG. 4, skirt 20 is applied to the lure by passing line-attaching eye 14 and wire portion 13 through sleeve 21 and then forcing the sleeve onto nose portion 3 of body 1. FIGS. 1 and 4 show the usual manner of application, with the skirt being applied by passing the wire through the sleeve from the end of the sleeve to which strands 22 are joined toward the plain end of the sleeve.

THE EMBODIMENT OF FIG. 5

The lure illustrated in FIG. 5 comprises a weighted body 51 having an enlarged main portion 52 and a nose portion 53 of smaller transverse dimension, a hook 55, wire elements 59 and 59a, and a skirt 70. Wire element 59 includes a straight portion 60 which terminates at one end in a curved portion which extends through the eye of the hook, and a forwardly projecting portion 63. Wire element 59a includes a trailing portion 62 which emerges from trailing end face 69 below the point at which shank 58 emerges, so that the hook shank and wire portion 62 extend in closely spaced, mutually generally parallel relation, with wire portion 62 located below the hook shank when the lure is in the normal position seen in FIG. 5.

Portion 63 of wire element 59 slants forwardly and upwardly, is bent upon itself in a complete loop to form line-attaching eye 64, and includes a straight portion 63a which slants rearwardly and upwardly from eye 64 and terminates in a loop 75 which extends through one closed eye of the barrel swivel of a conventional snap swivel 76. A spinner blade 77 is connected to the snap swivel.

Trailing portion 62 of the wire element terminates in a stop loop 65, attractor beads 66 being provided ahead of loop 65, and a spinner blade 68 being connected to loop 65 by a barrel swivel 67 and wire ring 67a. Wire elements 59 and 59a are highly resilient but shapable by bending, so that the positions of both spinner blades 68 and 77 can be adjusted relative to hook 55 by bending portions 62 and 63, 63a respectively.

Skirt 70 is identical with skirt 20, FIGS. 1 and 4, and comprises a sleeve 71 and a plurality of strands 72. With spinner blade 77 detached, the sleeve of the skirt is passed over snap swivel 76, wire portion 63a, eye 64, and wire portion 63, the sleeve then being forced onto nose portion 53, and spinner blade 77 then attached again to the snap swivel. Presence of snap swivel 76 allows the spinner blade 77 to be removed for replacement of skirt 70, or to reverse the position of the skirt.

THE EMBODIMENT OF FIGS. 6–10

The lure shown in FIGS. 6–8 comprises a weighted body 101 having a main portion 102 and a forwardly projecting nose portion 103. With the lure in the normal position seen in FIG. 6, the bottom edge of body 101 is substantially straight, portion 102 is of substantially greater vertical transverse dimension than is nose portion 103, and the nose portion projects from the lower portion of the body, so that the upper edge slants forwardly and downwardly as indicated at 104. Hook 105 has a turned-up eye 106 embedded in body 101 and a straight shank 108 projecting from the rear face 119 of the body. A first wire element 109 has a straight portion 110, which extends axially through nose portion 103, a trailing portion 112, which extends parallel to and below shank 108 of the hook, and a leading end portion 113 which extends forwardly from the tip of nose portion 103 for a short distance, thence downwardly and then rearwardly to terminate in a free end 113a which is spaced from the bottom edge of nose portion 103 by only a small distance. At its trailing end, portion 112 is bent to form an eye 115 to which a barrel swivel 117 is connected, a conventional spinner blade 118 being attached to swivel 117.

A second wire element 109a is employed, one end thereof being looped through the eye of the hook as indicated at 131. Straight portion 132 of wire element 109a emerges from body 110 through edge 104 and slants upwardly and forwardly. Wire element 109a is bent upon itself to provide a line-attaching eye 133. A straight portion 134 of the wire element extends upwardly and rearwardly from eye 133, terminating in an attachment eye 135. A spinner blade 136 is detachably connected to eye 135 by snap swivel 137.

Skirt 120 is identical to skirt 20, FIGS. 1 and 4, and comprises an attaching sleeve 121 and a plurality of ribbon-like strands 122 all extending from one end of the sleeve. To install the skirt, sleeve 121 thereof is passed over portion 113 of wire element 109 and then forced onto nose portion 103, accidental forward displacement of sleeve 121 from nose portion 103 then being prevented by wire portion 113 and its bent tip 113a. Formed of polyethylene or like material, sleeve 121 is sufficiently deformable to allow manual removal of the skirt from the lure. It will be apparent that skirt 120 can be installed in the usual orientation, seen in FIG. 6, or reversed in the fashion shown in FIG. 8.

The lure just described can be modified by substituting a hook 105a, FIG. 9, of the jig hook type for the hook 105, FIG. 6, the upper spinner 136 and wire element 109a thus being eliminated. In this modification, the eye 133a of the jig hook constitutes the line-attaching eye of the lure and is located at the top of main portion 102 of the lure body. Otherwise, the lure of FIG. 9 is as described with reference to FIG. 6.

The broken lines in FIG. 9 illustrate the manner in which wire portion 108 can be reshaped by bending to lower the position of spinner 118, allowing, e.g., pork rind strip 118a to be attached to hook 105a, with both the pork rind and spinner 118 being free to act without interference.

The lure of this embodiment can be further modified by substituting a straight shank hook 105b, FIG. 10, for hook 105, FIG. 6, and employing a short, straight wire element 109b in place of element 109a. wire element 109b has one end looped through the hook eye, the straight length of the wire slanting upwardly and forwardly to terminate in line-attaching eye 133b.

THE EMBODIMENTS OF FIGS. 11 AND 12

The lure shown in FIG. 11 comprises a weighted body 201 having a trailing portion 202 of larger transverse cross-section and a forwardly projecting nose 203 of smaller transverse cross-section. Straight shank hook 205 has its eye embedded in body portion 202, the shank of the hook emerging from and projecting rearwardly from trailing end face 219 of the body in hook-up disposition.

Wire means 209 includes a straight portion 210, which extends through nose portion 203 into body 201 and through the eye of hook 205, a straight portion 213 slanting upwardly and forwardly from the tip of nose portion 203 and terminating in line-attaching eye 214, and a separate trailing portion 212 which also extends through the eye of the hook. Trailing portion 212 emerges through face 219 below hook shank 208 and extends generally parallel to the hook shank. At a point adjacent the bight of the hook, wire portion 212 is bent downwardly at approximately right angles to provide a dependent portion 240. At the lower end of portion 240, the wire element is recurved at 241 and continues with an upwardly extending portion 242. At the upper end of portion 242, the wire element is looped at 243 around portion 240, a straight portion 244 of the wire element then extending rearwardly to terminate in an attachment eye 215. A larger spinner blade 218 is connected to eye 215, as by barrel swivel 217 and wire ring 217a. A smaller spinner blade 245 is connected to the closed loop constituted by portions 240-243, such connection being via barrel swivel 246 and wire ring 247.

Skirt 220 is identical with skirt 20, FIG. 1, and is installed by slipping its sleeve 221 over wire portion 213 and onto nose portion 203. The illustrated positions of strands 222 and spinner blades 218, 245 are typical for normal operation of the lure, and it will be noted that, while spinner blade 245 is near hook 205 and immediately adjacent the trailing end portion of the skirt, blade 245 and skirt strands 222 are mutually non-interfering because wire portions 240-243 support blade 245 in a position below the skirt. Advantageously, portions 240 and 242 slant downwardly and rearwardly at a small angle, as illustrated, tending to maintain swivel 246 at recurved portion 241.

The structure can be modified, as shown in FIG. 12, by bending portion 241a in at least one complete circle to constitute, in effect, a torsion spring. The barrel swivel 246 is connected to the loop formed by portion 241, as by means of a wire ring 248.

In all of the embodiments of the invention illustrated, mounting of the skirt on a forwardly projecting nose portion of the weighted body allows the trailing end of the body to be of a size significantly larger than the diameter of the attaching sleeve of the skirt. Accordingly, both a hook shank and a wire member for attachment of a spinner can emerge in generally side-by-side relation from the trailing end of the weighted body. The enlarged trailing end of the weighted body provides enough lead or other material to fix both the hook and wire securely in position, and to afford adequate support to allow the trailing portion of the wire to be bent manually to adjust the position of its spinner relative to the hook.

An advantage of the invention is that the skirt can be reversed, as seen in FIG. 8, so that the strands extend first forwardly from the attaching sleeve, then outwardly and then rearwardly, so that the appearance of the skirt is different and bulkier than when the skirt is applied as seen in FIG. 1. Using conventional multi-layer skirts having inner strands of one color and outer strands of another, the reversing capability afforded by the invention enables the fisherman to change the effective or overall color appearance of the skirt by choosing between the FIG. 1 position and the FIG. 8 position.

While advantageous embodiments of the invention have been illustrated and described, it will be apparent that various changes and modifications can be made therein without departing from the scope of the invention as defined in the appended claims. Thus, for example, other spinners than the single blade type shown can be employed and the weighted body of the lure can be formed of moldable or castable materials other than lead.

What is claimed is:
1. In a fishing lure, the combination of
 a weighted body comprising
  a main body portion, and
  a nose portion of smaller transverse dimension than said main portion,
  said nose portion projecting forwardly from said main portion;
 hook means connected to said main portion of said weighted body and arranged to trail the same;
 a wire means including a wire element extending longitudinally through at least said nose portion of said weighted body and projecting forwardly therefrom; and
 a skirt comprising
  an attaching sleeve, and
  a plurality of flexible strands joined at one end to said attaching sleeve,
  said attaching sleeve embracing said nose portion of said weighted body;
 said skirt being removable by slipping said attaching sleeve forwardly off of said nose portion and passing said sleeve over and off of the forwardly projecting portion of said wire element.
2. The combination defined in claim 1, wherein
 said hook means comprises a single hook having a portion of its shank embedded in said weighted body, said shank emerging from the trailing end of said main portion of the body; and
 said wire means includes a trailing portion which emerges from the trailing end of said main portion of the body and extends generally parallel to the shank of said hook;
 the combination further comprising
 a spinner carried by said trailing portion of said wire means.
3. The combination defined in claim 2, wherein
 the lure has a normal position in which the point of said single hook is above the shank thereof; and
 said trailing portion of said wire means is located below the shank of said hook.

4. The combination defined in claim 3, wherein
the portion of said wire element which projects forwardly from said nose portion slants upwardly and forwardly to a line-attaching eye which is so dimensioned that said attaching sleeve of the skirt can be passed thereover.

5. The combination defined in claim 4, wherein
said line-attaching eye is in the form of a complete loop in the wire of said wire element, and said wire element further includes a portion slanting upwardly and rearwardly from said line-attaching eye, said last-mentioned portion of said wire member terminating in an attachment portion
the combination further comprising
a second spinner; and
means detachably connecting said second spinner to said attachment portion.

6. The combination defined in claim 2, wherein
the portion of said wire element which projects forwardly from said nose portion is bent laterally at a point immediately adjacent said nose portion and terminates in an offset tip portion near said nose portion;
the combination further comprising
a second wire element having one end embedded in said weighted body,
said second wire element slanting upwardly and forwardly from said weighted body and having a line-attaching eye.

7. The combination defined in claim 6, wherein
said line-attaching eye of said second wire element is in the form of a complete loop in the wire of said element;
said second wire element includes a portion slanting upwardly and rearwardly from said line-attaching eye and terminating to an attachment portion;
the combination further comprising
a second spinner; and
means detachably connecting said second spinner to said attchment portion of said second wire element.

8. The combination defined in claim 6, wherein
said single hook has its eye exposed at the top of said weighted body, the eye of the hook constituting line-attachment means for the lure.

9. The combination defined in claim 2, wherein
the lure has a normal position in which the point of said hook is above the shank thereof; and
said trailing portion of said wire member is located above the shank of said hook.

10. The combination defined in claim 1, wherein
the portion of said wire element which projects forwardly from said nose portion is bent laterally at a point immediately adjacent said nose portion and terminates in an offset tip portion near said nose portion.

11. The combination defined in claim 1, wherein
said wire means includes a trailing portion which emerges from said main body portion and comprises
a straight first portion which extends rearwardly from said body,
a second portion which projects laterally from the trailing end of said first portion,
a curved third portion at the end of said second portion,
a fourth portion extending from said curved portion back to the location of said first portion, and
a fifth portion extending rearwardly from said fourth portion and terminating in attachment means;
the combination further comprising
first spinner means operatively attached to said fifth portion of said trailing portion of said wire means; and
second spinner means operatively attached to the offset constituted by said second, third and fourth portions of said trailing portion of said wire means,
the dimensions of said offset being such, relative to the dimensions of said skirt, that said second spinner means is located outside the space occupied by strands of said skirt as the lure is drawn through the water.

12. The combination defined in claim 11, wherein
said first and second spinner means each include a spinner blade; and
said blade of said first spinner means is larger than that of said second spinner means.

13. The combination defined in claim 11, wherein
said fourth portion of said trailing portion of said wire means terminates in a curved portion hooked around said second portion and constituting the junction between said fourth and fifth portions.

14. The combination defined in claim 11, wherein
said curved third portion extends for at least one complete circle; and
said second spinner means is attached to said third portion.

15. In a fishing lure, the combination of
a weighted body comprising
a main body portion, and
a nose portion of smaller transverse dimension than said main portion,
said nose portion projecting forwardly from said main portion;
hook means connected to said main portion of said weighted body and arranged to trail the same;
spinner support means connected to said main portion of said weighted body and projecting rearwardly therefrom;
leader means connected to said weighted body and extending forwardly from the tip of said nose portion; and
a skirt comprising
an attaching sleeve, and
a plurality of flexible strands joined at one end to said attaching sleeve,
said attaching sleeve embracing said nose portion of said weighted body;
said skirt being removable by slipping said attaching said sleeve forwardly off of said nose portion and passing said sleeve over and off of said leader means.

16. In a fishing lure, the combination of
a weighted body comprising
a main body portion, and
a nose portion projecting longitudinally from said main body portion;
hook means connected to said weighted body and arranged to trail the same;
skirt means connected to said nose portion and comprising a plurality of flexible strands arranged to trail said weighted body as the lure is drawn through the water,
the combination of said weighted body, said hook means and said skirt being so dimensioned and arranged that said strands of said skirt occupy a space generally surrounding said hook means as the lure is drawn through the water;
a wire element fixed to said weighted body and comprising
 a first portion projecting rearwardly from said body,
 an offset portion projecting laterally from said first portion and including two laterally extending parts joined together at their outer ends, and
 another portion generally aligned with said first portion and projecting rearwardly from said offset portion;
first spinner means attached to the trailing end of said other portion of said wire element; and
second spinner means attached to said offset portion, said wire element and said first and second spinner means being so dimensioned and arranged that, as the lure is drawn through the water, said first spinner means is spaced significantly behind the trailing end of said skirt and said second spinner means occupies a position outside the space occupied by the strands of said skirt.

* * * * *